Oct. 30, 1945.  C. M. KENDRICK  2,387,761
FLUID PRESSURE DEVICE
Filed April 17, 1942  5 Sheets-Sheet 1

INVENTOR
Charles M. Kendrick
BY
Bartlett Eyre Keel & Weymouth
ATTORNEYS

Oct. 30, 1945.    C. M. KENDRICK    2,387,761
FLUID PRESSURE DEVICE
Filed April 17, 1942    5 Sheets-Sheet 2
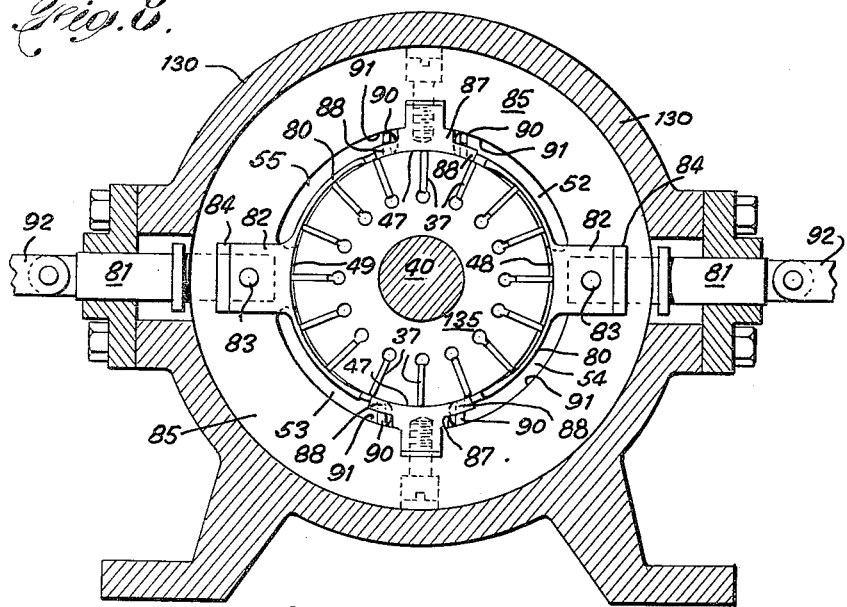
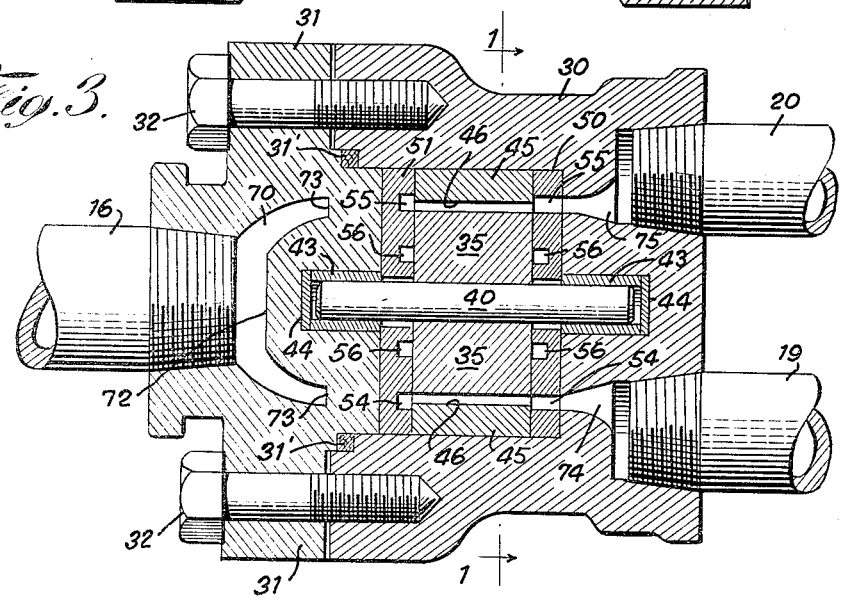
INVENTOR
Charles M. Kendrick
BY
Bartlett Eyre Keel + Weymouth
ATTORNEYS Oct. 30, 1945.  C. M. KENDRICK  2,387,761
FLUID PRESSURE DEVICE
Filed April 17, 1942  5 Sheets—Sheet 3

INVENTOR
*Charles M. Kendrick*
BY
*Bartlett Eyre Keel & Weymouth*
ATTORNEYS

Oct. 30, 1945.                C. M. KENDRICK                2,387,761
                            FLUID PRESSURE DEVICE
                         Filed April 17, 1942        5 Sheets—Sheet 4

INVENTOR
Charles M. Kendrick
BY
Bartlett Eyre Keel & Weymouth
ATTORNEYS

Oct. 30, 1945.  C. M. KENDRICK  2,387,761
FLUID PRESSURE DEVICE
Filed April 17, 1942  5 Sheets—Sheet 5

INVENTOR
Charles M. Kendrick
BY
Bartlett Eyre Keel & Weymouth
ATTORNEYS

Patented Oct. 30, 1945

2,387,761

UNITED STATES PATENT OFFICE 2,387,761

FLUID PRESSURE DEVICE

Charles M. Kendrick, New York, N. Y., assignor to Manly Corporation, Washington, D. C., a corporation of Delaware Application April 17, 1942, Serial No. 439,326

15 Claims. (Cl. 103—1)

This invention relates to fluid pressure devices for simultaneously controlling a plurality of fluid volumes relative to each other and adapted for use, for example, in systems having a plurality of passages or the like in which it is desired to simultaneously and substantially exactly regulate and control the relative rates of fluid flow therethrough. For example, in some systems of this general character it is desired to provide relatively equal and simultaneous flow of fluid through two passages in order to provide substantially equal and simultaneous movement of two driven members operated by pressure fluid supplied from a common source to said members through said passages. In other instances, by way of further example, it may be desired to control the relative rates of fluid flow in a plurality of passages in both directions of flow therethrough in order, for instance, to control the operation of a plurality of reversible fluid actuated devices in both directions of their operation. In still other instances, by way of still further example, it may be desired to provide unequal but proportional flow of fluid through two or more passages, with the fluid for all of these passages supplied from a common source or from separate sources, in order, for example, to provide simultaneous and proportionate operation of a plurality of fluid actuated devices, or to cause the delivery of proportionate amounts of the same or different fluids or the like.

One important use for devices of the character to which the present invention is directed is as part of the hydraulic circuit employed in connection with two hydraulically actuated "landing" flaps of an airplane, in which the two flaps must be moved simultaneously and substantially equally, at least in the direction in which they are moved when a landing is to be made, as unequal movement thereof would tend to upset the balance of the airplane. While the present invention is particularly well suited for use in the hydraulic circuits just mentioned, it is not limited to such use. For example, it is also suited for use in a circuit for hydraulically actuated ailerons or in connection with any other hydraulically actuated aircraft controls in which two or more members must be moved in unison, at equal or proportionate and coordinated speeds, in the same or in opposite directions. The present invention is also suited for numerous other uses such, for example, as controlling the operation of two or more hydraulic pistons in pressing or broaching operations or the like, or in controlling the operation of two or more fluid actuated devices whose speeds must be coordinated, such, for example, as in numerous processing and manufacturing operations.

In one aspect the device of the present invention may be termed a "flow divider" as in one direction of flow it can divide fluid from a single source into a plurality of parts of predetermined proportions. It is also capable, however, of regulating the relative fluid flow through each of a plurality of passages in both directions of flow therethrough, irrespective of whether the fluid for all of the passages is supplied by a single source or a plurality of sources. The present invention may thus also be termed an "equalizer," a "proportionator," a "regulator," a "controller" or the like. For convenience the device of the present invention will be termed a "controller" in the description and explanation which follow and it will be understood that this term is intended to include such devices for all of the uses and applications mentioned as well as for all other uses for which the invention is suited.

An object of the present invention is to provide an improved fluid pressure device of the character indicated.

Another object is to provide an improved fluid pressure device of this character that is compact and light in weight, so that it is particularly well suited for aviation use, and in which there can be no "slip" due to escape of fluid from the portion of the fluid circuit disposed in said device, with all leakage or "slip" within said device limited entirely to the small and frequently negligible amount due to leakage of fluid from the high pressure areas of the device into the low pressure areas thereof.

A further object is to provide an improved fluid pressure device of the character indicated in which the proportions of the respective fluid volumes to be controlled may be adjusted and varied at will, in order, for example, to provide substantially any desired predetermined relation between said volumes within the capacity of the device.

Other objects will appear from the description and explanation which follow.

The invention will be understood from consideration of the accompanying drawings which illustrate, by way of example, several embodiments of the present invention.

In the accompanying drawings:

Fig. 3 is a horizontal longitudinal sectional view taken along the line 3—3 of Fig. 1;

Figure 1:
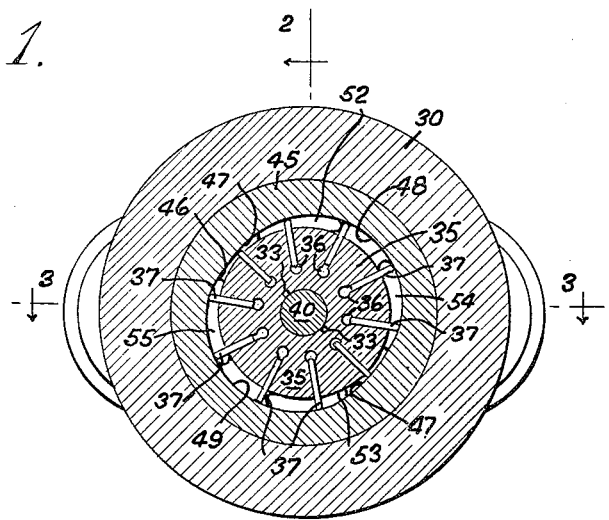
Fig. 1 is a view in vertical transverse section taken along the lines 1—1 of Figs. 2 and 3, and showing a fluid pressure device constructed according to the present invention.
Figure 10:
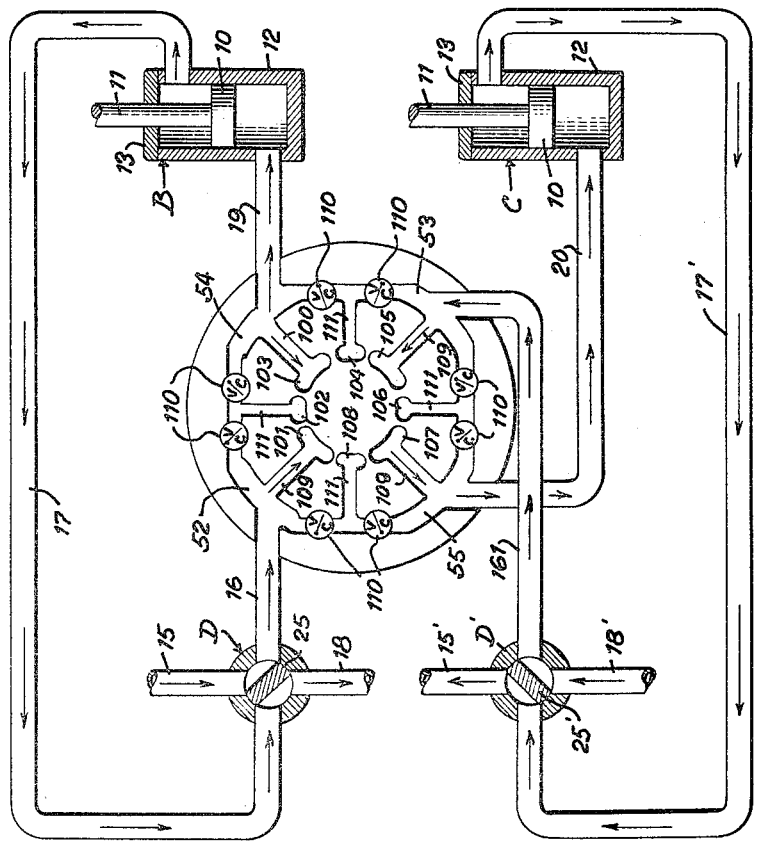
Figure 7A:
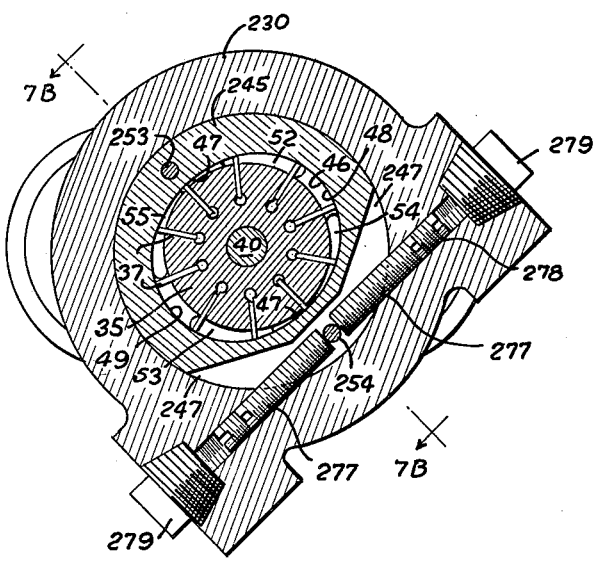
Fig. 7 is a view in vertical transverse section corresponding generally to Fig. 1 but illustrating a modification.
Figure 7B:
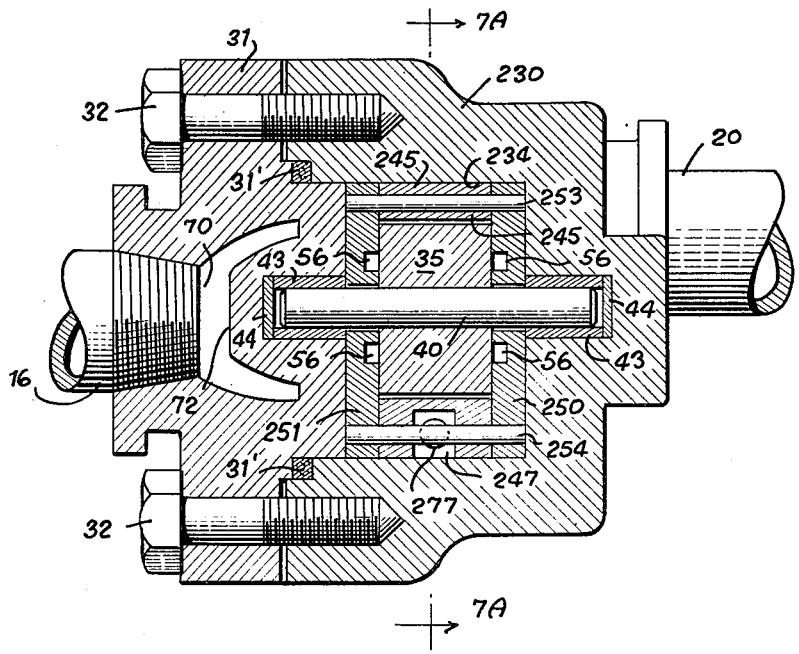

Fig. 7-A is also a view in vertical transverse section corresponding generally to Fig. 1 and illustrating a further modification;

Fig. 7B is a longitudinal sectional view taken along the line 7A—7A of Fig. 7-A;

Fig. 8 is also a view in vertical transverse section illustrating a further modification;

Fig. 9 is a diagrammatic view, partly in section, of a fluid system including a fluid pressure device according to the present invention; and Fig. 10 is also a diagrammatic view, partly in section, showing a modification.

Referring first to Fig. 9, I have diagrammatically illustrated a fluid pressure device of the vane type constructed according to the present invention, broadly designated by the letter A and hereinafter termed the "controller" in connection with a fluid circuit which also includes a pair of hydraulic motors broadly designated by the letters B and C respectively and a reversing or selector valve broadly designated by the letter D. The hydraulic motors B and C may be of any preferred type but are here shown as each comprising a piston 10 reciprocable in its cylinder 12 and having a piston rod 11 extending through the cover member 13 of said cylinder 12 for connection with the corresponding flap of the airplane or other member to be actuated thereby. The hydraulic motors B and C are presumed to be identical in every respect so that admission of equal amounts of pressure fluid to them will cause equal movements of their pistons 10 and, similarly, so that equal movements of their pistons 10 will cause the exhaust of equal amounts of fluid from their corresponding cylinders 12. The arrangement is further presumed to be such that substantially no leakage takes place past the pistons 10 or past the piston rods 11 at the openings in the cover member 13 through which said piston rods pass, suitable packing, not shown, being employed in the conventional manner for this purpose.

In this embodiment pressure fluid for actuating both of the hydraulic motors B and C is supplied from a common source, not shown, through a supply passage 15 which connects with the inlet port 26 of the selector valve D. The selector valve D is also provided with a port 27 which connects with a passage 16 leading to and connecting with the controller A to be more fully described presently and said controller A is in turn connected with a pair of passages 19 and 20 leading to and connecting with corresponding ends of the cylinders 12 of the hydraulic motors B and C; from the standpoint of functioning of the controller, it is immaterial as to whether the passages 19 and 20 connect with the piston rod ends of the cylinders 12 or, as illustrated, with the otherwise closed ends of said cylinders, but it is essential that said passages 19 and 20 connect with corresponding ends of said cylinders 12 when differential pistons are employed and when equal movement thereof is desired. The selector valve D is further provided with a port 28 which connects with a branched passage 17 leading to and connecting with corresponding ends of the cylinders 12 of the hydraulic motors B and C, here shown as connected with the piston rod ends of said cylinders. The selector valve is still further provided with a port 29 which connects with an exhaust passage 18 which may lead to a reservoir or the like, not shown.

With the arrangement above described, when the rotatable valve body 25 of the selector valve D is in the position shown in Fig. 9 pressure fluid from the supply passage 15 passes through the passage 16 to and through the controller A, thence through the passages 19 and 20 to the cylinders 12 of the hydraulic motors B and C respectively, causing movement of the pistons 10 toward the cover members 13. Fluid exhausted by the cylinders 12 passes through the branched passage 17, through the selector valve D and out through the exhaust passage 18. Rotation of the valve body 25 through 90° connects the supply passage 15 with the branched passage 17 and connects the passage 16 with the exhaust passage 18, causing operation of the pistons 10 in a direction away from the cover members 13 of their corresponding cylinders 12 and the flow of fluid is the reverse of that just described. Rotation of the valve body 25 so that it covers any of the ports 26, 27, 28 or 29 of the selector valve D cuts off communication of the hydraulic motors B and C with the supply passage 15 and also with the exhaust passage 18, thus stopping operation of said motors.

In the particular embodiment illustrated, the controller A of the present invention functions to provide and assure the passage of simultaneously and substantially equal fluid volumes through the passages 19 and 20, in both directions of fluid flow therethrough, and hence functions to provide and assure simultaneously and substantially equal movements of the two pistons 10 in both directions of their operation. An illustrative embodiment of the regulator or controller A will now be described and its operation explained.

The particular embodiment of the controller A illustrated in Figs. 1 to 6 inclusive includes two axially separable casing parts 30 and 31 (Figs. 2 and 3), termed the casing and the end head respectively, which are held together by any suitable means such as the cap screws 32. The casing 30 is provided with a cavity for the rotor 35 and associated parts, this cavity being closed on one end and having an open end which in turn is closed by the end head 31 as clearly shown in Figs. 2 and 3. The rotor 35 is provided with a plurality of diametrically positioned vanes 37 (Figs. 1 and 4) which are movable inward and outward in a substantially radial direction in slots 36 formed in said rotor 35, said slots 36 being equally spaced from one another in a circumferential direction in order to provide equal spacing of the vanes 37 therein.

In contrast with the construction employed in conventional fluid pressure devices, the rotor 35 of the controller A is not provided with either a driving shaft or a driven shaft or with any other mechanical power transmitting means extending beyond the casing 30 or the end head 31, but is merely supported for rotation in any preferred manner. In the present embodiment the rotor 35 is shown as supported by a shaft 40 extending through a central opening in said rotor 35 and which in turn is supported by a pair of bearings 43 carried by the casing 30 and end head 31 respectively as clearly shown in Figs. 2 and 3. The rotor 35 may be attached to the shaft 40 for rotation in unison therewith, or said shaft 40 may take the form of axially extending hubs formed integrally with said rotor 35, but in the particular embodiment illustrated the rotor 35 is free to revolve on the shaft 40 and said shaft 40 is also free to revolve in its bearings 43. This arrangement has several advantages; for example, it permits relative rotation of the parts to take place in whatever manner produces minimum friction and also provides an added factor of safety in that the device may continue to operate if for any reason the rotor 35 should bind on its shaft 40 or if the shaft 40 should for any reason bind in its bearings 43. With this arrangement the shaft 40 is not located axially by the rotor 35 and hence end thrust bearings 44 are provided which may engage the corresponding end of the shaft 40 if for any reason it should be displaced axially away from its mid-position in which it is shown. The central opening of the rotor 35 is also provided with a pair of grooves 33 (Fig. 1) which extend from one axial side or end of the rotor to the other; these grooves 33 serve to provide lubrication of the bearing surfaces of the shaft 40 and of the central opening of said rotor 35 in the event of rotation of said rotor relative to said shaft and also establish balance of fluid pressures acting on the portions of the axial ends of said rotor adjacent said shaft thus also tending to equalize fluid pressures acting on the opposite ends of said shaft 40. The grooves 33, which are preferably spiral or the like, are also preferably disposed diametrically opposite one another in the central opening of the rotor 35 in order to provide balance of forces imposed on said rotor and on said shaft by pressure fluid in said grooves 33.

A vane track ring 45 (Figs. 1, 2 and 3) surrounds the rotor and vane assembly and its inner circumferential surface 46 forms a track surface adapted to contact the radially outer ends of the vanes 37 as the rotor revolves and to guide and control the vanes 37 in their inward and outward movement; the surface 46 will hereinafter be termed the "vane track."

According to the present invention the controller A is provided with a separate fluid transferring or control section for each of the fluid volumes to be regulated or controlled. In the present illustrative embodiment there are two fluid volumes to be controlled, that is to say the fluid volumes passing through the passages 19 and 20 of Fig. 9, and the controller A is accordingly provided with two fluid sections. As shown in Fig. 1 the division between the two fluid sections is effected by cooperation of the rotor 35 and the outer ends of the vanes 37 with the vane track 46 at the regions of the vane track's least diameter which in the present embodiment is adjacent the 45° line extending from the upper left to the lower right of Fig. 1. The vane track 46 is preferably provided at each of these points of division with an arc 47, for convenience termed a "sealing arc," which is preferably concentric with the rotor 35, but not necessarily so, and which extends in a circumferential direction for a distance equal at least to the angular distance between a pair of adjacent vanes 37.

Each of the two fluid sections comprises a fluid transfer or working chamber flanked by an inlet area and an outlet area, the inlet and outlet areas of each section being interchangeable upon reversal of fluid flow in the circuit as will be more fully explained subsequently. The fluid transfer chambers are formed by means of two oppositely positioned arcs 48 and 49 respectively (Fig. 1), for convenience termed the "fluid transfer arcs" or the "working arcs," which are located in the region of the greatest diameter of the vane track 46 and which in the present embodiment is adjacent the 45° line extending from the upper right to the lower left of Fig. 1. The fluid transfer arcs 48 and 49 are preferably concentric with the rotor 35, but not necessarily so, and each of them extends in a circumferential direction for a distance equal at least to the angular distance between a pair of adjacent vanes 37. Circulated fluid is admitted to the spaces between the outer ends of the vanes 37 as they move through the inlet areas toward and across the fluid transfer arcs and fluid is discharged into the outlet areas of the two fluid sections from the spaces in advance of the vanes 37 as they move across said fluid transfer arcs and as said vanes recede therefrom. The inlet area of each fluid section is thus at all times separated from the outlet area of the same fluid section by at least one of the vanes 37. The portions of the vane track 46 intermediate the sealing arcs 47 and fluid transfer arcs 48 and 49 may be given any suitable curvature producing satisfactory rates of inward and outward movement of the vanes 37 as the rotor 35 revolves.

As in part above stated and as shown in Fig. 1, the fluid transfer arcs 48 and 49 are preferably of the same arcuate length and are preferably disposed diametrically opposite one another, the sealing arcs 47 are likewise preferably of the same arcuate length and positioned diametrically opposite one another and the inlet and outlet areas of one fluid section are also preferably of the same arcuate length and disposed diametrically opposite the inlet and outlet areas respectively of the other fluid section. With this arrangement the fluid imposed forces acting on the rotor 35 in a radial direction are thus balanced when the same pressure exists in the fluid inlet areas of both fluid sections and when the same pressure exists in the outlet areas of the two fluid sections, with the only unbalanced force ever imposed on the rotor 35 in a radial direction by action of the pressure fluid being due solely to and corresponding to any difference in fluid pressures that may exist in diametrically opposite fluid inlet or outlet areas. The shaft 40 and its bearings 43 are thus freed from all or the greater part of the load due to action of pressure fluid on the rotor 35 in a radial direction.

At this point it may be noted that in Fig. 1 the sealing arcs 47 and fluid transfer arcs 48 and 49 are shown as disposed adjacent the 45° lines as already explained. In Figs. 9 and 10, however, for convenience in illustration, the relative position of these parts is shown as having been rotated in a counter-clockwise direction through 45° so that the sealing arcs 47 of the diagrammatically illustrated controllers corresponding to these figures would be located adjacent the horizontal centerline and the fluid transfer arcs 48 and 49 would be located adjacent the vertical centerline as indicated by the outline of the vane track 46 shown in dotted lines in Fig. 9.

The controller A also includes a pair of mating disc-shaped members 50 and 51 respectively (Figs.

2, 3, 5 and 6), for convenience termed "end plates" or "cheek plates," which are provided with holes at their centers for the shaft 40. The outer faces or surfaces of the cheek plates 50 and 51 fit snugly against the wall surfaces of the closed end of the cavity in the casing 30 and of the end head 31 respectively and form substantially fluid tight fits with the several ports or passages in said wall surfaces to be presently described. The inner or opposing "rotor" faces of the cheek plates 50 and 51 form fluid tight fits with the sides of the vane track ring 45 by which they are axially positioned with respect to the rotor 35 in such manner that the rotor is permitted to turn freely while its sides or axial ends and the axial ends of the vanes 37 form substantially fluid tight running fits with the adjacent faces of the cheek plates 50 and 51.

Figure 6:
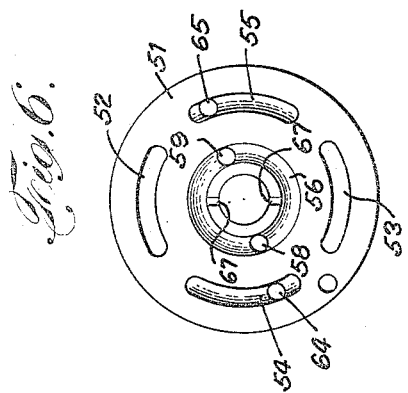
Figs. 5 and 6 show an inner elevation or the "rotor face" of two members, for convenience termed "end plates" or "cheek plates"
Figure 5:
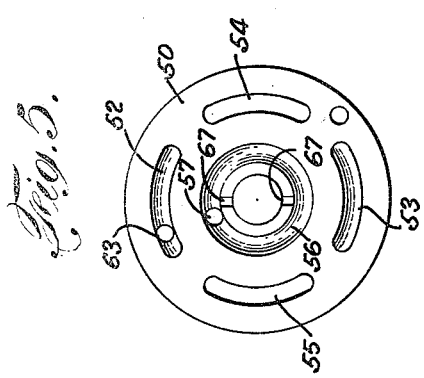

The cheek plates 50 and 51 are provided with coextensive mating ports (Figs. 1, 2, 3, 5 and 6), the ports of one cheek plate being axially opposite the ports of the other cheek plate when the parts are in position in the casing 30 so that all forces exerted upon the rotor 35 and vanes 37 in an axial direction by fluid pressure are thus completely balanced. The ports in the cheek plates 50 and 51 will be best understood from Figs. 5 and 6 which show inner elevations or the rotor faces of the cheek plates 50 and 51 respectively. Referring to Figs. 5 and 6, each cheek plate is provided with a pair of diametrically opposed arcuate slots or ports 52 and 53 respectively and a similar pair of diametrically opposed slots or ports 54 and 55 respectively; either pair of these ports may be the inlet ports and the other pair will be the outlet ports, depending upon the direction of flow of fluid in the circuit. By reference to Figs. 2, 5 and 6 it will be observed that the ports 52 and 53 extend entirely through the cheek plate 51 whereas they do not extend through the cheek plate 50 but take the form of recessed grooves which function principally as balance ports. Similarly, by reference to Figs. 3, 5 and 6 it will be observed that the ports 54 and 55 extend entirely through the cheek plate 50 whereas they take the form of recessed grooves in the cheek plate 51 and function principally as balance ports to produce balance of hydraulic forces acting in axial directions upon the rotor 35 and vanes 37 as previously stated. This is the preferred arrangement as it tends to reduce leakage but it is not essential and all of these ports 52, 53, 54 and 55 may, if desired, be made to extend entirely through both of the cheek plates 50 and 51.

It is also necessary to provide fluid connections for the inner ends of the vanes 37 and this may be accomplished by any of the known methods suitable for such use in vane type fluid pressure devices, such, for example, as the arrangements disclosed in U. S. Patents No. 2,255,781, No. 2,255,784, No. 2,255,785 or No. 2,255,786 or as disclosed in copending application filed March 29, 1941, Serial Number 385,820. In the particular embodiment illustrated I have shown fluid connections for the inner ends of the vanes 37 as provided by a recessed annular groove of port 56 (Figs. 2, 3, 5, 6 and 9) formed in each of the cheek plates 50 and 51 and positioned to register with the inner ends of the vane slots 36. The particular arrangement shown is also made such that the port 56 of one or both of the cheek plates is continuously connected with whichever of the ports 52, 53, 54 or 55 may, at any instant, contain fluid under the greatest pressure. A method for providing such connections for the ports 56 is schematically shown in Fig. 9 in which it will be observed that the port 56 shown therein is provided with three holes 57, 58 and 59 respectively which connect with three passages 60, 61 and 62 respectively, said passages leading to and connecting with holes 63, 64 and 65 respectively in the ports 52, 54 and 55 respectively. Each of the passages 60, 61 and 62 is provided with a one-way check valve 66 which is arranged to permit the passage of fluid from the corresponding port 52, 54 or 55 into the port 56 but prevents the passage of fluid in the opposite direction. No connection between the port 53 and the port 56 is shown and none is required in the present embodiment as the pressure in the ports 52 and 53 will at all times be the same as will be understood from the drawings and from the further description of the fluid circuit which follows. In Figs. 5 and 6 the holes 57 and 63 for the connection between the ports 52 and 56 are shown as provided in the cheek plate 50 (Fig. 5) and similarly the holes 58, 59, 64 and 65 for the connections between the ports 54 and 55 respectively with the port 56 are shown as provided only in the cheek plate 51 (Fig. 6).

Each cheek plate 50 and 51 is also provided with a pair of radial grooves 67 (Figs. 2, 5 and 6) which are formed in the rotor face of said cheek plate and extend from the port 56 to the hole at the center of said cheek plate through which the shaft 40 passes. These grooves 67 perform the functions of lubricating the adjacent and surface of the rotor 35 and also admitting pressure fluid to the space surrounding the shaft 40 adjacent each end thereof so that this space is completely filled at all times with fluid under substantially the same pressure, whereby hydraulic balance of the parts in an axial direction is provided and the bearings 43 of the shaft 40 are well lubricated.

Figure 4:
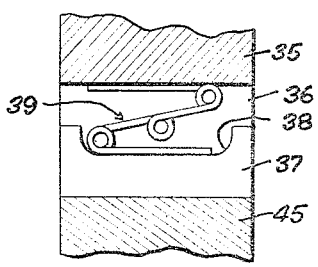
Fig. 4 is an enlarged fragmentary view illustrating one of the vanes of the device together with the spring means and a portion of the arrangements therefor employed in connection therewith.

For quiet and satisfactory operation of the controller A it is necessary to supplement the action of centrifugal force on the vanes 37 with an auxiliary force urging said vanes into contact with the vane track 46 during at least the portion of their rotary travel in which the outer ends of said vanes are passing through the fluid areas of the two fluid sections which at the time are the inlet areas thereof. This may be accomplished by any known means suitable for this purpose, such, for example, as the differential fluid pressure means disclosed in the patents above mentioned. For purposes of illustration, however, I have shown vane spring means similar to such means and the cooperating arrangements therefor fully disclosed and claimed in copending application S. N. 385,820 above mentioned. Referring to Fig. 4, the central portion of the inner end of each vane 37 is cut away to form a recessed seat 38 for the corresponding vane spring 39, one portion of the vane spring 39 bearing against said seat 38 and another portion of said vane spring bearing against the inner end of the corresponding vane slot 36. It will be understood, of course, that each vane 37 is provided with its individual vane spring 39, the arrangement for all vanes being the same as that shown for the vane 37 illustrated in Fig. 4. For more detailed description of the vane springs 39 and the cooperating arrangements therefor, reference may be had to copending application S. N. 385,820 above mentioned; for present purposes suffice it to say that the vane springs 39 function to continuously maintain the outer ends of the vanes 37 in contact with the vane track 46.

Figure 2:
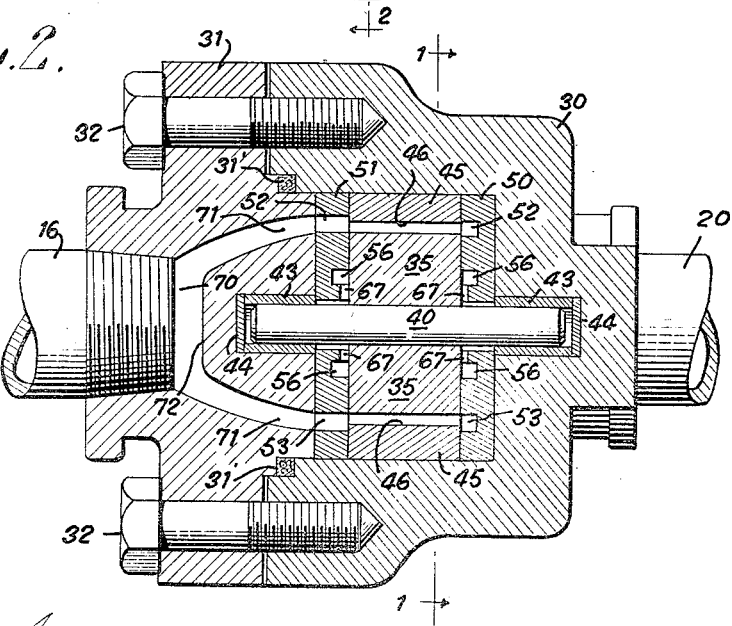
Fig. 2 is a vertical longitudinal sectional view, taken along the line 2—2 of Fig. 1.

As shown in Figs. 2 and 3 the passage 16 connects with a passage or annular chamber 70 of variable diameter and provided with a pair of branches or extensions 71 (Fig. 2) which extend through the end head 31 and connect with the ports 52 and 53 of the cheek plate 51. This arrangement has several advantages; for example, in many installations it will reduce the load on the cap screws 32 by an amount equal to the force exerted by the pressure fluid in the passage 16 upon an area equal to the inside cross-sectional area of said passage 16. This arrangement also has the advantage of reducing or entirely eliminating deflection of the wall portion of the end head 31 away from the cheek plate 51 and rotor 35 which deflection tends to take place due to action of pressure fluid in the rotor cavity. This reduction or elimination of deflection is due to action of pressure fluid on the closed end or wall surfaces 72 and 73 of the chamber 70; in fact, with this arrangement there may even be a tendency in some instances to deflect the wall of said end head 31 toward the rotor 35 which would tend to off-set any slight displacement of the end head 31 as a unit with respect to the rotor 35 and cheek plates 50 and 51 which displacement might be due to stretch of the cap screws 32 or the like under the force exerted by the pressure fluid in the rotor cavity. Reduced deflection of the end head 31 away from the rotor 35 is important and contributes toward low internal leakage or slip in the controller, particularly when operated at high pressures, and this construction has the further advantage of meeting all requirements in this respect in an end head of relatively light weight, the latter being of particular importance in aviation applications. The construction just described is not limited to use in controllers of the present invention, however, but may also be employed to advantage in other fluid pressure devices of the vane type or of other types having axially separable casing members whose relative positions influence the efficiency or slip of the device.

As shown in Fig. 3 the port 54 of the cheek plate 50 connects with a passage 74 formed in the casing 30 which leads to and connects with the passage 19. In contrast with conventional fluid pressure devices, there is no fluid connection between the port 54 and the port 55 but on the contrary the port 55 of the cheek plate 50 connects with a separate passage 75 formed in the casing 30 which leads to and connects with the passage 20.

With the circuit, including all internal space in the controller A, completely filled with fluid, such, for example, as oil, and the valve body 25 of the selector valve D in the position shown in Fig. 9, pressure fluid from the supply passage 15 will pass through the passage 16, into the chamber 70 in the end head 31 and thence through the extensions 71, the ports 52 and 53 of the cheek plate 51 and into the fluid areas connected with said ports, which areas will then be the inlet areas for the two fluid sections. Pressure fluid acting on the adjacent faces of the vanes 37 which are then in contact with the fluid transfer arcs 48 and 49 respectively will cause rotation of the rotor 35 and vanes 37 in a clockwise direction as viewed in Fig. 1. As the vane in contact with the fluid transfer arc 48 moves across said arc 48 the fluid ahead of said vane 37 is forced into the outlet area connected with the port 54 and at the same time and to the same extent the diametrically positioned vane 37 in contact with the fluid transfer arc 49 is forcing the fluid ahead of it into the fluid area connected with the port 55; the areas connected with said ports 54 and 55 are the outlet areas of the two fluid sections in this direction of fluid flow. Clockwise rotation of the rotor and vane assembly, comprising the rotor 35 and vanes 37, thus causes the transfer of fluid from the area connected with the port 52 into the area connected with the port 54 and similarly causes the separate transfer of fluid from the area connected with the port 53 into the area connected with the port 55. The volume of fluid transferred from the inlet area of one fluid section to the outlet area thereof in any time interval will be substantially exactly the same as the volume of fluid transferred from the inlet area of the other fluid section into the outlet area thereof if the capacities or effective displacements of two fluid sections are equal to one another. The capacities or effective displacements of the two fluid sections may be made equal to each other by providing equal radial clearances between the periphery of the rotor 35 and the two sealing arcs 47 and by also providing equal radial clearances or spacings between the periphery of the rotor 35 and the fluid transfer arcs 48 and 49 respectively, as is here presumed to be the case.

With this arrangement, therefore, the controller A functions to simultaneously and separately admit or transfer to the ports 54 and 55, and hence to the passages 19 and 20 respectively, substantially exactly equal volumes of fluid for each rotation or fraction of rotation of the rotor and vane assembly, whereby simultaneous and substantially exactly equal movements of the pistons 10 of the hydraulic motors B and C are provided and assured. The foregoing is the case irrespective of resistance to movement of the pistons 10 of the hydraulic motors B and C, within the limits, of course, to which the pressure of the fluid from the supply line 15 is capable of producing motion of said pistons 10, and also irrespective of whether the resistance to movement encountered by one of the pistons 10 exceeds that of the other of said pistons. For example, if the resistance to movement of the piston 10 of the motor B is greater than the resistance to movement of the piston 10 of the motor C the pressure of the fluid in the passage 19 and the portions of the circuit directly connected therewith will increase above the pressure in the passage 20 and the portions of the circuit directly connected with said passage 20, but the volumes of fluid separately admitted or transferred to the two passages 19 and 20 will remain unchanged and substantially exactly equal to each other except, perhaps, for the slightly greater slip or internal leakage in the fluid section connected with the passage 19 due to the greater difference in the pressures existing in its inlet and outlet areas. Such increased slip or internal leakage, if any, will be extremely small and practically negligible in most instances if occurring at all; further, increase of pressure in the passage 19 and the portions of the controller directly connected therewith, to continue the above example, will cause slight deflection of the shaft 40 in a direction generally away from the fluid transfer arc 48, thereby slightly and correspondingly increasing the capacity of that fluid section and simultaneously and correspondingly reducing the capacity of the other fluid section, thus tending to compensate for any difference in the slips or internal leakages taking place in the two fluid sections under these conditions.

The pressures existing in the passages 19 and 20 and the portions of the fluid circuit directly connected therewith are determined by the resistances to movement encountered by the pistons 10 of the motors B and C when the supply passage 15 is connected with the passage 16 as shown in Fig. 9 and now under consideration. The pressures existing in the ports 52 and 53, the passage 16 and hence in the passage 15 are determined by the pressures existing in the ports 54 and 55 which, of course, correspond to the pressures in the passages 19 and 20 respectively. The maximum pressure permitted to exist in the supply passage 15 is usually determined by a conventional relief valve, not shown. Each of the passages 19 and 20 may also be provided with a relief valve 14 (Fig. 9), which may exhaust into a reservoir or the like, not shown, in order to limit the maximum pressure therein and also to permit movement of both pistons 10 through their full strokes (one of said relief valves opening under pressure when its piston strikes its stop) due to minute slip or internal leakage of fluid in the controller, leakage past the pistons 10 or for any other reason.

As will be understood from the foregoing, the rotor and vane assembly is rotated entirely by the fluid passing through the controller and frequently there will be very little difference in pressures of the fluid in the inlet and outlet areas of the controller, such pressure difference in such instances being due solely to the force expended in rotation of rotor and vane assembly, which is relatively small; this will particularly be the case when the resistances to movement of the two pistons 10 are substantially the same and the pressures in the passages 19 and 20 are therefore substantially equal. But it will also be understood that the controller of the present invention is likewise capable of providing different pressures in the passages 19 and 20, as already stated, and, in fact, is capable of providing in one of the passages, such, for example, as the passage 19, pressure in excess of the pressure in the passage 16 provided that there is a corresponding decrease in the pressure of the fluid in the other of the passages such as the passage 20 in the present example. In other words, by way of further example and neglecting the losses in the controller, a pressure of 1000 pounds per square inch in the passage 16 might provide a pressure of 1000 pounds per square inch in both of the passages 19 and 20; or said pressure of 1000 pounds per square inch in said passage 16 might provide a pressure of 1500 pounds per square inch in one of the passages and a pressure of 500 pounds per square inch in the other of the passages; or said pressure of 1000 pounds per square inch in said passage 16 might provide 2000 pounds per square inch pressure in one of the passages if the pressure in the other of said passages is zero, etc. The controller of the present invention thus effects and assures movement of both of the pistons 10 in the event that they present different resistances to movement and is also capable of moving one of said pistons against a greater resistance than could be overcome if the supply line 15 were connected directly to such piston.

The controller A of the present invention thus functions as a distributor of power in addition to distributing or dividing the total volume of working pressure fluid into substantially predetermined parts or portions, with the pressure of each portion depending upon the resistance to discharge from the corresponding outlet area. The latter holds true irrespective of differences in pressures in the respective outlet areas and irrespective of the fact that the pressure of one of the portions may exceed the pressure of the working pressure fluid admitted to the inlet areas. The device may thus also act or be employed as a rotary intensifier or pressure booster, as described above, which increases the pressure of the fluid discharged from one of the outlet areas above the pressure of the working pressure fluid, with corresponding decrease in the pressure of the fluid discharged from the other of the outlet areas relative to the pressure of the working pressure fluid.

The flow of fluid in the circuit of Fig. 9 will be the reverse of that just described if the valve body 25 of the selector valve D is rotated through 90° so as to connect the supply passage 15 with the passage 17 and to connect the passage 16 with the exhaust passage 18. Pressure fluid from the supply passage 15 will then be admitted directly to the cylinders 12 of the hydraulic motors B and C, causing movement of the pistons 10 thereof in a direction away from the cover members 13 and causing the exhaust of fluid from said cylinders 12 into the passage 19 and 20 respectively. The fluid areas connected with the ports 54 and 55 will then be the inlet areas of the two fluid sections and the fluid areas connected with the ports 52 and 53 will be the outlet areas thereof, and the rotor and vane assembly will be revolved in a counter-clockwise direction as viewed in Fig. 1.

In this direction of fluid flow the controller A acts to regulate and control the fluid volumes separately exhausted through the passages 19 and 20 respectively and to hold said exhausted volumes simultaneously and substantially exactly equal to one another, this regulation and control being effected as the rotor and vane assembly rotates and acting to provide simultaneous and substantially equal movement of the two pistons 10. Upon tendency of the piston 10 of one of the motors to move more rapidly than the piston 10 of the other motor, the controller A functions to produce a vacuum or partial vacuum in the cylinder 12 of the slower moving piston and in the portions of the fluid circuit directly connected therewith and to simultaneously produce a correspondingly increased pressure in the cylinder 12 of the more rapidly moving piston and the portions of the fluid circuit directly connected therewith. In other words and by way of example, if the piston 10 of the motor B tends to move more rapidly than the piston 10 of the motor C, the vanes 37 moving across the fluid transfer arc 49 will tend to exhaust fluid from the port 55 and the passage 20 more rapidly than fluid is being expelled from the corresponding cylinder 12 by its piston 10, thus creating a vacuum or partial vacuum in said port, in said passage and in the connected end of said cylinder 12; rotation of the rotor and vane assembly is then effected only by the fluid exhausted from the motor B with consequent increase in the pressure of the fluid in the port 54, the passage 19 and the end of the corresponding cylinder 12 connected with said passage 19, the amount of the pressure in said port 54 etc. being sufficient to rotate the rotor and vane assembly while the latter is producing the vacuum or partial vacuum in said port 55 etc. The resistance to movement of the piston 10 of the motor B is thus increased and the resistance to movement of the piston 10 of the motor C is simultaneously decreased, with consequent tendency to decrease the speed of the piston 10 of the motor B and to increase the speed of the piston 10 of the motor C, thereby tending to equalize the movement of the two pistons. The pressure in the passages 19 and 20 will thus be equal upon equal movements of the pistons 10 in a direction to exhaust fluid into said passages, but the pressure in said passages will vary upon tendency of one piston to move more rapidly than the other. With the arrangement as described up to this point the movement of the two pistons 10 will be equalized to the extent that such equalization can be produced by the vacuum or partial vacuum created in one of the cylinders 12 and the consequent increase in pressure in the other of the cylinders.

In some instances the difference in pressures in the passages 19 and 20 just described will be sufficient to effect the desired equalization of movements of the two pistons 10 but in other instances this will not be the case. I therefore provide means making possible a pressure difference in the passages 19 and 20 greater than that just described and, which may, in fact, be made any desired amount. Referring to Fig. 9 I have shown the passage 16 as provided with a one-way check valve 21 arranged to permit the passage of fluid from the selector valve D to the controller A but preventing the passage of fluid therethrough in the opposite direction. A by-pass line 22 is also provided through which fluid must pass as it moves from the controller A to the selector valve D and a resistance means 23, schematically shown in Fig. 9, is provided in the by-pass line 21. The arrangement is preferably made such that the resistance means 23 maintains a predetermined pressure in the portion of the by-pass line 22 and the portion of the passage 16 intermediate said resistance means 23 and the controller A when the direction of flow is from the controller to the selector valve D. A similar pressure will, of course, be maintained in the areas connected with the ports 52 and 53 (which will then be the outlet areas, as already mentioned) and thus presents resistance to rotation of the rotor and vane assembly.

With the arrangement just described, upon tendency of the piston 10 of one of the hydraulic motors B or C to move more rapidly than the piston 10 of the other motor, the piston tending to move more rapidly encounters not only the added resistance due to creation of the vacuum or partial vacuum in the cylinder 12 of the more slowly moving piston but also the added resistance due to the fact that only the fluid exhausted by the more rapidly moving piston 10 will be active to rotate the rotor and vane assembly against the resistance of fluid flow provided by the resistance means 23, as will be understood from explanation previously given. Similarly, the resistance of the more slowly moving piston 10 will be decreased because fluid being exhausted thereby will not be active to rotate the rotor and vane assembly. For example, if the resistance means 23 is made such as to maintain a pressure of 500 pounds per square inch in the portion of the circuit on the inlet side thereof, this pressure will exist in the ports 52 and 53 and the fluid areas connected therewith and, neglecting losses in the controller, will also exist in both of the passages 19 and 20 and the parts of the circuit directly connected therewith whenever the two pistons 10 are moving at equal speeds. If the piston 10 of the motor B, for example, tends to move more rapidly than the piston 10 of the motor C, the pressure in the passage 19 and the portion of the circuit directly connected therewith may instantly increase to as much as 1000 pounds per square inch (neglecting losses in the controller and the further added load incident to the vacuum in the cylinder 12 of the motor C) and the pressure in the passage 20 and the portion of the circuit directly connected therewith may instantly drop to substantially zero (neglecting the vacuum or partial vacuum produced in the cylinder 12 of the motor C). The piston 10 of the motor B would then encounter a resistance of 1000 pounds per square inch greater than the resistance of the piston 10 of the motor C so that their movements would be equalized instantly provided, of course, that this difference in resistance is sufficient to effect equalization of movement of the pistons. The foregoing example states an extreme condition, as in most instances movement of the two pistons 10 will be equalized by relatively small differences in the pressures in the passages 19 and 20. In practice the resistance means 23 may be conveniently embodied in the selector valve and the check valve 21 omitted, which is particularly desirable in aviation applications, and in any arrangement the resistance means 23 is preferably made such as to provide the minimum resistance capable of effecting equalization of movement of the pistons 10 and may, of course, be made of any magnitude required for this purpose.

The controller of the present invention and the embodiment just described have many advantages, some of which have been pointed out. Of greatest importance, of course, is that it accurately and dependably regulates and controls the volume of fluid passing through the two passages 19 and 20 in both directions of flow therethrough. Among its other advantages are its compactness, light weight and the simplicity of its parts. The end head 31 completely closes the cavity in the casing 10 for the rotor and associated parts, the packing 31' preventing the escape of fluid around said end head 31, so that the only openings into the rotor cavity are those provided for the fluid connections. There is thus no opportunity for fluid to leak out of the portion of the circuit disposed in the controller and the possibility of slip is thus reduced to the small amount of fluid leaking internally from the high pressure areas to the low pressure areas of the controller. Such internal leakage will be very small, particularly since all the space within the controller is completely filled with fluid, and will also be substantially equal in the two fluid sections when the pressures in the passages 19 and 20 are substantially equal so that the relative volumes of fluid admitted to or exhausted from the passages 19 and 20 respectively are not materially altered by the slip under these conditions. This is a very important feature and is in part made possible by the fact that the rotor is not provided with either a driving shaft or a driven shaft or with any other mechanical power transmitting means extending beyond the casing 30 or the end head 31 as previously pointed out.

Fig. 7 illustrates a modification including a modified vane track ring 45' arranged so that it may be shifted through a small distance transverse to the axis of rotation of the rotor and vane assembly in order to provide limited adjustment or variation in the capacities or effective displacements of the two fluid sections. In this modified form the diameter of the cavity 34 for the rotor and its associated parts, which is formed in the modified casing 30', is made slightly greater than the diameter of the vane track ring 45', thus providing a small clearance space through which said vane track ring 45' may be moved. The vane track ring 45' is provided with a pair of parallel flat slide surfaces 44' disposed opposite the sealing arcs 47 and arranged to slide on the opposing flat faces of the members 34' which are disposed intermediate said slide surfaces 44' and the circumferential wall of the cavity 34. The modified casing 30' is also provided with a pair of adjusting screws 77 which extend into the cavity 34 and are diametrically positioned adjacent the center lines of the fluid transfer arcs 48 and 49 respectively; suitable jam nuts 78 are provided for holding the screws 77 in the desired positions of their adjustment. Suitable sealing means are also provided to prevent the escape of fluid past the screws 77, such sealing means being here shown as cap nuts 79.

Movement of the vane track ring 45' transverse to the axis of rotation simultaneously increases the capacity of one fluid section and decreases the capacity of the other, so that the relative capacities of the two fluid sections may thus be altered to a limited extent by adjustment of the screws 77. The limit of possible adjustment is the distance through which the vane track ring 45' can be moved without bringing any part of its vane track surface into binding contact with the periphery of the rotor 35 and hence depends in part upon the radial clearance provided between the periphery of the rotor 35 and the sealing arcs 47. The arrangement is preferably made such, however, that the outer circumferential surface of the vane track ring 45' strikes the circumferential wall of the cavity 34 to prevent further movement of said vane track ring before any part of the vane track surface 46 strikes the periphery of the rotor 35. The limited adjustment of the capacities of the two fluid sections provided by this modified arrangement makes it possible to adjust the position of the vane track 45' to compensate for slight errors in machining or the like so that exactly equal capacities of the two fluid sections may be provided. This modified arrangement also makes it possible, however, to make the capacity of one fluid section slightly greater than that of the other fluid section which may be desirable in some instances, such, for example, as instances in which there is slightly more leakage in one of the hydraulic motors B or C than in the other.

Figs. 7—A and 7—B illustrate another modification in which the position of the vane track surface may be shifted relative to the rotor to alter the relative capacities of the two fluid sections of the controller. In this modified arrangement the shaft 40 is positioned eccentrically in the cavity 234 for the rotor which is formed in the modified casing 230 and the vane track surface 46 is also located eccentrically with respect to the periphery of the modified vane track ring 245. The arrangement is preferably such that in one position of the vane track ring 245 the two sealing arcs 47 are equally spaced in a radial direction from the periphery of the rotor 35 and similarly the two fluid transfer arcs 48 and 49 respectively are likewise equally spaced in a radial direction from the periphery of said rotor 35 substantially as illustrated in Fig. 7—A. The two cheek plates 250 and 251 (Fig. 7—B) are likewise modified so that the ports therein and the holes at their centers for the shaft 40 are eccentrically disposed with respect to their peripheries to correspond with the eccentric positioning of said shaft 40 in the modified cavity 234, the two cheek plates 250 and 251 being otherwise the same as the cheek plates 50 and 51 previously described. The cheek plates 250 and 251 are also connected with the vane track ring 245 for simultaneous movement therewith as by pins 253 and 254 respectively.

A groove or channel 247 is formed in the outer circumferential surface of the vane track ring 245 adjacent the pin 254, the approximate shape and location of this channel 247 being clearly shown in Figs. 7—A and 7—B. A pair of screws 277 project inward from the casing 230 with which they have threaded engagement and extend into the channel 247 so that their inner ends contact the pin 254 as shown in Fig. 7—A. Locking screws 278 are provided to hold the screws 277 in the desired adjusted positions and the openings for these screws are closed by suitable means such as the pipe plugs 279.

With this modified arrangement the vane track ring 245 may be shifted through a limited distance in a circumferential direction in the bore of the cavity 234 by adjustment of the screws 277. Such shifting of the vane track ring 245 alters the relative clearance spaces between the periphery of the rotor 35 and the two sealing arcs 47 and also alters the relative clearance spaces between the periphery of said rotor and the two fluid transfer arcs 48 and 49 respectively, thus altering the relative strokes of the vanes as they pass through the two fluid sections and decreasing the capacity of one fluid section while simultaneously increasing the capacity of the other section. The cheek plates 250 and 251 move in unison with the vane track ring 245 so that the porting for the vanes 37 is not disturbed when said ring 245 is shifted circumferentially, the arrangement also being such that the ports in said cheek plates 250 and 251 maintain the necessary fluid connections with the fluid passages in the casing and end head respectively throughout the limited distance through which said cheek plates may be shifted in unison with said ring 245. The modified arrangement of Figs. 7—A and 7—B thus has substantially the same advantages as the arrangement illustrated in Fig. 7.

In the foregoing it has been assumed to be desired that the controller should function to provide the passing of equal or nearly equal and predetermined volumes of fluid through the passages 19 and 20 respectively. In some instances it will be desired, however, to provide the passage of definite, predetermined and controlled but materially unequal fluid volumes through the passages 19 and 20 or their equivalents; for example, this might be desired in instances where unequal but coordinated operation of two hydraulic motors is desired, or in instances where the motors must operate at equal speeds but in which the capacity of one motor must be greater than the other or the like. Any desired relation between the fluid volumes passing through such passages as the passages 19 and 20 may be obtained by making the capacities of the fluid sections unequal but in the desired relation or proportions to each other. For example, in the arrangement illustrated in Fig. 9, the volume of fluid passing through the passage 19 may be made twice the fluid volume passing through the passage 20 if the capacity of the fluid section connected with said passage 19 is made double the capacity of the other fluid section which is connected with said passage 20. This or any other desired relation or relative proportions of the two fluid sections may be provided in a controller of fixed capacity by providing unequal radial clearance spaces of proper proportions intermediate the periphery of the rotor 35 and the sealing arcs 47, or intermediate the periphery of said rotor 35 and the fluid transfer arcs 48 and 49 respectively or intermediate the periphery of the rotor and both the sealing arcs 47 and the fluid transfer arcs 48 and 49 respectively. In practice, however, it is usually preferable to provide substantially equal radial clearance spaces intermediate the periphery of the rotor and the sealing arcs 47 and to obtain the desired difference in the capacities of the fluid actions by providing the proper difference in the radial clearance spaces intermediate the periphery of the rotor 35 and the fluid transfer arcs 48 and 49 respectively. In all events, however, in vane type fluid pressure devices of the character illustrated the desired relative capacity of each fluid section may be said to be obtained by making the stroke or distance of inward and outward movement of the vanes 37 while passing through that fluid section such as to produce the desired capacity thereof.

In some instances, however, it may be desirable to provide adjustment of the capacities of one or all of the fluid sections through a relatively wide range of variation in relative capacities thereof in order to be able to obtain any desired proportions between the capacities of such fluid sections. In Fig. 8 I have accordingly shown a modification, drawn on a scale different from that of Figs. 1–7, in which the capacity of each fluid section may be varied or adjusted to any desired extent from minimum to maximum.

In the particular embodiment shown, the controller is provided with adjustable vane tracks, generally indicated at 80, for the outer ends of the vanes 37. The particular structure of the adjustable vane tracks forms no part of the present application but a part of copending application filed November 23, 1940, Serial Number 366,931 which is in part a continuation of application Serial Number 247,586, filed December 24, 1938. It is to be understood, however, that the structure of the adjustable vane tracks may assume any suitable form, such, for example, as shown in U. S. Patents Nos. 2,141,170 and 2,141,171, or as shown in copending application filed March 23, 1939, Serial Number 263,649 or in copending application filed May 31, 1941, Serial Number 395,950.

In the modification shown in Fig. 8 the capacity of each fluid section of the controller may be varied from minimum to maximum by lateral movement of its adjusting rod 81 which is suitably attached to the radially slidable member 82 as, for example, by a pin 83. Each of the members 82 is slidably mounted in a recess or opening 84 formed in a spacer ring 85 which is disposed in the interior of the modified casing 130 and the radially inner ends of said members 82 are provided with fluid transfer arcs 48 and 49, here shown as positioned adjacent the horizontal center line. In the embodiment shown, the capacity of each fluid section is increased by outward movement of its adjusting rod 81 with respect to the axis of the rotor and the capacity thereof is decreased by inward movement of said adjusting rod 81.

The space intermediate the periphery of the modified rotor 135 and the inner circumferential surface of the spacer ring 85 is divided into two fluid sections by means of a pair of oppositely positioned fixed abutments 87 (here shown as positioned adjacent the vertical center line) and by cooperation of the rotor and vanes with the sealing arcs 47 carried on the radially inner ends of said fixed abutments 87. The fixed abutments 87 are also provided with prongs or extensions 88 having track surfaces thereon which over-lap the track surfaces on the contiguous ends of the adjustable track members 80. The ends of the adjustable track members 80 adjacent the fixed abutments 87 are provided with guide members 90 which cooperate with the guide surfaces 91 carried by the inner circumferential surface of the spacer ring 85 to maintain the track surfaces of the ends of said adjustable track members 80 in vane transferring relation with the track surfaces on said prongs 88 in all positions of adjustment of said adjustable track members 80.

With this arrangement the capacity of each fluid section may be made any desired amount from minimum to maximum by movement of its adjusting rod 81, such movement being effected by any suitable means, not shown, which may be conveniently attached to the links 92 at the outer ends of said adjusting rods 81. It is thus possible to provide any desired relation between the capacities of the two fluid sections of the controller so that the volumes of fluid passing through the passages 19 and 20 or their equivalent may be made to bear any desired relation to each other.

Fig. 10 illustrates in somewhat schematic arrangement further modifications of the controller and of the fluid circuit therefor. In this instance each fluid section of the controller is connected with its own separate fluid circuit, these circuits including respectively the separate fluid supply passages 15 and 15', the separate selector valves D and D', the separate passages 16 and 16' connecting said selector valves with the respective fluid sections, the separate fluid passages 17 and 17' directly connecting said selector valves with said motors B and C respectively and the separate fluid exhaust passages 18 and 18'. With this arrangement it is preferable that the valve bodies 25 and 25' of the selector valves D and D' be rotated in unison in any suitable manner. The provision of the separate circuits does not affect the functioning of the controller which will act to provide and assure that the fluid volume passing through one of the passages 19 or 20 bears a predetermined and substantially exact relation to the fluid volume passing through the other of these passages, thereby providing control of operation of the motors B and C in both directions of their operation in the same general manner as previously explained.

Fig. 10 also shows modified fluid connections for the inner ends of the vanes which include eight ports 101 to 108 inclusive arranged to register with the inner ends of the vane slots 36 of the rotor. The ports 104 and 108 are arranged to connect with the inner ends of the vanes 37 during the time that the outer ends thereof are traversing the sealing arcs 47 and similarly the ports 102 and 106 are arranged to connect with the inner ends of said vanes during the time that the outer ends thereof are traversing the fluid transfer arcs 48 and 49 respectively. The other four ports 101, 103, 105 and 107 are arranged to connect with the inner ends of the vanes 37 during the time that the outer ends thereof are passing intermediate the sealing arcs and the fluid transfer arcs and said ports are connected by radial passages 109 with the ports 52, 54, 53 and 55 respectively so that there is balance of fluid pressures acting on the inner and outer ends of the vanes 37 during this portion of their rotary travel. The port 102 is adapted to be connected with whichever of the ports 52 or 54 contains fluid under the greater pressure. Each of the ports 52 and 54 is accordingly connected in any appropriate manner with a one-way check valve 110 which permits fluid to pass out of the corresponding port but prevents the passage of fluid in the other direction and the check valves 110 for said ports 52 and 54 in turn connect with a passage 111 leading to and connecting with the port 102. With this arrangement the fluid acting on the inner end of each vane during the time that said inner end is in connection with the port 102 will be the highest pressure simultaneously acting on the outer end thereof as it traverses the fluid transfer arc 48 so that said vane is firmly held in contact with the vane track surface. The fluid connections for the ports 104, 106 and 108 are the same as those just described in connection with the port 102 except, of course, that the port 104 is arranged to be connected with either the port 53 or the port 54, etc. With this arrangement, therefore, the inner ends of the vanes are at all times acted upon by fluid having the highest pressure simultaneously acting on the outer ends thereof, assuring that the vanes are kept in firm contact with the vane track as previously stated.

It will be understood that the foregoing are merely exemplifying disclosures and that changes, some of which have been indicated, may be made without departing from the applicant's invention which is defined in the appended claims. For example, the controller may comprise more than two fluid sections and may thus function to regulate and control the volumes of fluid simultaneously passing through a correspondingly increased number of passages.

I claim:

1. In a multi-section fluid pressure device for simultaneously controlling a plurality of fluid volumes, a rotary assembly comprising a single rotor having a plurality of vanes movable inward and outward thereof, supporting means for said rotary assembly, a casing totally enclosing said rotary assembly and said supporting means, a track for said vanes disposed in said casing and arranged to cooperate with said rotary assembly to provide a fluid section for each fluid volume to be controlled, each fluid section having an inlet area and an outlet area disposed adjacent said track, said rotary assembly being arranged for rotation only by the fluid passing through the fluid sections of said device and being active upon rotation thereof to control the fluid volumes passing from the inlet areas to the outlet areas of said fluid sections, and inlet and outlet means for said inlet and outlet areas respectively, with said last named means for at least one area of each fluid section being separate from and without open connection with said inlet and outlet means for all of the other areas.

2. A rotary fluid pressure device for simultaneously controlling a plurality of fluid volumes comprising a fluid control section for each volume to be controlled, each fluid section comprising a fluid transfer chamber having an inlet area and an outlet area on opposite circumferential sides thereof, at least one of said areas of each fluid section being without direct fluid connection with the corresponding area of each of the other of said fluid sections, a revoluble shaft, a rotary assembly comprising a single rotor having a plurality of vanes movable inward and outward thereof, said rotor being mounted on said shaft to permit relative rotation with respect thereto, and a vane track for said vanes adapted to contact one of the ends thereof and to guide said vanes in their in and out movement, said rotary assembly being arranged for rotation solely by the fluid passing from said inlet areas to said outlet areas and being active upon rotation to control in predetermined relation to each other the fluid volumes simultaneously passing from the respective inlet areas of said fluid sections to the corresponding outlet areas thereof.

3. In a rotary fluid pressure device, enclosing means comprising a casing and an end head axially separable with respect to said casing, means attaching said end head to said casing, a cavity in said enclosing means having a pair of walls on the axial ends thereof, one of said walls being carried by the casing and the other being carried by the end head, a rotatable element disposed in said cavity and having high pressure and low pressure areas adjacent the periphery thereof, said walls of said cavity cooperating with said element to separate said high and low pressure areas from one another, the pressure of the fluid in said areas tending to deflect the wall of said cavity carried by said end head in a direction away from said element, and means for decreasing the deflection of said last named wall of said cavity comprising an opening in the outer surface of said end head arranged for connection with a supply of pressure fluid, and a chamber formed in said end head intermediate said opening and the wall of said cavity, said chamber being disposed adjacent the axis of rotation of said element and having a diameter greater than the diameter of said opening, said chamber comprising an end wall disposed opposite said opening and axially opposite the wall of said cavity carried by said end head, and said chamber also having an outer wall carrying said opening and connected with the end wall of said chamber only at the periphery thereof.

4. In a fluid pressure device for simultaneously controlling two fluid volumes relative to each other, a rotary assembly comprising a rotor having a plurality of vanes movable inward and outward thereof in a substantially radial direction, a vane track ring including a track for guiding the vanes in their in and out movement and arranged to provide two diametrically opposed fluid transfer chambers each having an inlet area and an outlet area adjacent thereto and disposed on opposite circumferential sides thereof, fluid connections for said inlet and outlet areas including a pair of separate and unconnected passages for the two fluid volumes to be controlled, one of said passages being connected with one of the areas adjacent one of said chambers and the other of said passages being connected with the corresponding area adjacent the other chamber, said rotary assembly being arranged for rotation solely by the fluid passing through said chambers and functioning upon rotation to control the fluid volume transferred from the inlet area adjacent one of said chambers to the outlet area on the opposite circumferential side thereof in predetermined relation with respect to the fluid volume simultaneously transferred from the inlet area adjacent the other chamber to the outlet area on the opposite circumferential side thereof, means for shifting said vane track ring relative to the axis of rotation of the rotary assembly to increase the fluid volume transferred from the inlet area to the outlet area adjacent one of said chambers and to simultaneously decrease the fluid volume transferred from the inlet area to the outlet area adjacent the other of said chambers, and a casing enclosing said rotary assembly and said vane track ring.

5. In a fluid pressure device for simultaneously controlling two fluid volumes relative to each other, a rotary assembly comprising a rotor element having a plurality of vanes movable inward and outward thereof in a substantially radial direction, a vane track ring including a track element for guiding the vanes in their in and out movement and arranged to provide two diametrically opposed fluid transfer chambers each having an inlet area and an outlet area adjacent thereto and disposed on opposite circumferential sides thereof, fluid connections for said inlet and outlet areas including a pair of separate and unconnected passages for the two fluid volumes to be controlled, one of said passages being connected with one of the areas adjacent one of said chambers and the other of said passages being connected with the corresponding area adjacent the other chamber, said rotary assembly functioning upon rotation to control the fluid volume transferred from the inlet area adjacent one of said chambers to the outlet area on the opposite circumferential side thereof in predetermined relation with respect to the fluid volume simultaneously transferred from the inlet area adjacent the other chamber to the outlet area on the opposite circumferential side thereof, means for altering the position of one of said elements with respect to the other to increase the fluid volume transferred from the inlet area to the outlet area adjacent one of said chambers and to simultaneously decrease the fluid volume transferred from the inlet area to the outlet area adjacent the other chamber, and a casing enclosing said rotor element and said vane track ring.

6. A rotary fluid pressure device for simultaneously controlling a plurality of fluid volumes relative to each other comprising a fluid section for each volume to be controlled, each fluid section comprising a fluid transfer chamber having an inlet area and an outlet area on opposite circumferential sides thereof, at least one of said areas of each fluid section being without direct fluid connection with the corresponding area of each of the other of said fluid sections, a rotary assembly comprising a single rotor having a plurality of vanes movable inward and outward thereof, said rotary assembly being arranged for rotation solely by the passage of fluid through the fluid sections of said device and functioning upon rotation to transfer fluid from the inlet area of each fluid section to the outlet area thereof, and means adjustable to alter the relative volume of fluid transferred from the inlet area to the outlet area of at least one of said fluid sections.

7. In a fluid pressure device for simultaneously controlling two fluid volumes relative to each other, a rotary assembly comprising a single rotor having a plurality of vanes movable inward and outward thereof in a substantially radial direction, a laterally movable vane track ring including a track for guiding the vanes in their in and out movement and arranged to provide two diametrically opposed fluid transfer chambers each having an inlet area and an outlet area adjacent thereto and disposed on opposite circumferential sides thereof, at least one of said areas adjacent one of said chambers being without direct fluid communication with the corresponding area adjacent the other chamber, said rotary assembly being rotated by the fluid passing through said chambers and functioning upon rotation to transfer a fluid volume from the inlet area adjacent each of said chambers to the outlet area on the opposite circumferential side of the corresponding chamber, fluid inlet means and fluid outlet means for said inlet and outlet areas respectively, means for laterally moving said vane track ring relative to the rotor to increase the fluid volume transferred from the inlet area to the outlet area adjacent one of said chambers and to simultaneously decrease the fluid volume transferred simultaneously from the inlet area to the outlet area adjacent the other of said chambers, and a casing enclosing said rotary assembly and said vane track ring.

8. In a fluid pressure device for simultaneously controlling two fluid volumes relative to each other, a rotary assembly comprising a rotor having a plurality of vanes movable inward and outward thereof in a substantially radial direction, a vane track ring disposed eccentrically with respect to said rotor and arranged for limited circumferential movement, said vane track ring including a track for guiding the vanes in their in and out movement and arranged to provide two fluid transfer chambers disposed substantially diametrically opposite one another with respect to the rotor and positioned eccentrically with respect to the periphery of said vane track ring, each chamber having an inlet area and an outlet area adjacent thereto and disposed on opposite circumferential sides thereof, at least one of said areas adjacent one of said chambers being without direct fluid communication with the corresponding area adjacent the other chamber, said rotary assembly being rotated by the fluid passing through said chambers and functioning upon rotation to transfer a fluid volume from the inlet area adjacent each of said chambers to the outlet area on the opposite circumferential side of the corresponding chamber, fluid inlet means and fluid outlet means for said inlet and outlet means respectively, means adjustable to move said vane track ring circumferentially to alter the relative capacities of said chambers and to thereby increase the fluid volume transferred from the inlet area to the outlet area adjacent one of said chambers and to simultaneously decrease the fluid volume transferred simultaneously from the inlet area to the outlet area adjacent the other of said chambers, and a casing enclosing said rotary assembly and said vane track ring.

9. In a device for simultaneously controlling a plurality of fluid volumes relative to each other, a fluid control section for each volume to be controlled, each fluid section comprising an inlet area and an outlet area, one area of each section being with direct fluid communication with the corresponding area of each of the other of said sections and the other area of each section having a common fluid connection with the corresponding area of each of the other of said sections, resistance means in said common fluid connection arranged to provide limited resistance to the outward passage therethrough of fluid from the areas connected therewith, and a rotary assembly comprising a rotary piston carrying element common to all of said sections and a plurality of pistons carried by said element and reciprocable with respect thereto, said rotary assembly being rotated solely by the passage of fluid through said sections and being active upon rotation thereof and upon reciprocation of said pistons to transfer a fluid volume from the inlet area of each section to the outlet area thereof with the volume transferred in each section having a predetermined relation to the volume simultaneously transferred in each of the other of said sections.

10. A rotary fluid pressure device for simultaneously controlling a plurality of fluid volumes comprising a fluid transferring section for each volume to be controlled, each fluid section comprising a fluid transfer chamber having an inlet area and an outlet area disposed on opposite circumferential sides thereof, at least one of said areas of each fluid section being without direct fluid connection with the corresponding areas of the other of said fluid sections, a rotary assembly comprising a rotor having a plurality of vanes movable inward and outward thereof, said rotor being disposed in power transmitting relation solely with said vanes and said rotary assembly being rotated solely by the passage of fluid through the fluid sections of said device, a vane track for said vanes adapted to contact one of the ends thereof and arranged to produce a complete cycle of inward and outward movement of each vane during the time that said vane passes through each of said fluid sections, and means independent of centrifugal force for urging said vanes into contact with said vane track.

11. In a rotary vane type fluid pressure device for simultaneously delivering two volumes of fluid, a rotary assembly comprising a rotor element having a plurality of vanes movable inward and outward thereof in a substantially radial direction, vane track means including a track element for guiding the vanes in their in and out movement and arranged to provide two diametrically opposed chambers each having an inlet area and an outlet area adjacent thereto and disposed on opposite circumferential sides thereof, fluid connections for said inlet areas, separate and unconnected fluid outlet passages for said outlet areas respectively, said rotary assembly functioning upon rotation to transfer from the inlet area adjacent one of said chambers to the outlet area on the opposite circumferential side of said last named chamber a fluid volume having a predetermined relation to the fluid volume simultaneously transferred from the inlet area adjacent the other chamber to the outlet area on the opposite circumferential side thereof, whereby said device delivers two separate fluid volumes having a predetermined relation to on another, means for altering the relation of one of said volumes with respect to the other, said last named means comprising means for altering the position of one of said elements with respect to the other to thereby increase the fluid volume transferred from the inlet area to the outlet area adjacent one of said chambers and to simultaneously decrease the fluid volume transferred from the inlet area to the outlet area adjacent the other chamber, and a casing enclosing said rotary element and said vane track ring.

12. In a rotary vane type fluid pressure device having two fluid sections and arranged to simultaneously deliver two volumes of fluid, a rotary assembly comprising a rotor having a plurality of vanes movable inward and outward thereof in a substantially radial direction, a vane track ring including a track for guiding the vanes in their in and out movement and having a pair of working arcs arranged to provide two diametrically opposed chambers each having an inlet area and an outlet area adjacent thereto and disposed on opposite circumferential sides thereof, said chambers and said areas being disposed adjacent the periphery of said rotor, fluid inlet connections for said inlet areas, separate and unconnected fluid outlet connections for said outlet areas respectively, said rotary assembly functioning upon rotation thereof to transfer from the inlet area adjacent one of said chambers to the outlet area on the opposite circumferential side of said last named chamber a fluid volume having a predetermined relation with respect to the fluid volume simultaneously transferred from the inlet area adjacent the other chamber to the outlet area on the opposite circumferential side thereof, whereby the device delivers two separate volumes of fluid with the relation of the two volumes to one another depending upon the relative distances of the working arcs from the periphery of the rotor, means for shifting said vane track ring relative to the rotor to increase the distance of one working arc from the periphery of the rotor and to simultaneously decrease the distance of the other working arc from the periphery of the rotor to thereby correspondingly alter the relation between the two fluid volumes, and a casing enclosing said rotary assembly and said vane track ring.

13. A rotary fluid pressure device for simultaneously controlling a plurality of fluid volumes comprising a fluid transferring section for each volume to be controlled, each fluid section comprising a fluid transfer chamber having an inlet area and an outlet area disposed on opposite circumferential sides thereof, at least one of said areas of each fluid section being without direct fluid connection with the corresponding areas of the other of said fluid sections, a rotary assembly comprising a rotor having a plurality of vanes movable inward and outward thereof, said rotor being disposed in power transmitting relation solely with said vanes and said rotary assembly being rotated solely by the passage of fluid through the fluid sections of said device, a vane track for said vanes adapted to contact one of the ends thereof and arranged to produce a complete cycle of inward and outward movement of each vane during the time that said vane passes through each of said fluid sections, and means independent of centrifugal force for urging said vanes into contact with said vane track comprising a spring for each vane arranged to urge the corresponding vane toward said vane track.

14. A fluid pressure device of the class described having two fluid sections, each section comprising an inlet area and an outlet area, separate outlet means for each of said outlet areas, said outlet areas and means being without direct fluid connection therebetween, rotary fluid transfer means common to both of said sections and arranged for rotation solely responsive to difference in the pressures in the inlet area and outlet area of at least one of said sections, said rotary fluid transfer means being active upon rotation thereof to transfer a fluid volume from the inlet area of each section to the outlet area thereof with the volumes transferred in one of said sections having a substantially predetermined relation to the volume simultaneously transferred in the other of said sections, said rotary fluid transfer means also being active upon rotation thereof to produce in each outlet area a pressure of the fluid dependent upon the resistance to discharge of fluid from the corresponding outlet area, irrespective of difference in pressures in said outlet areas, and means for admitting working pressure fluid simultaneously to the inlet areas of both of said sections.

15. A rotary fluid pressure device for simultaneously providing two controlled fluid volumes comprising a fluid section for each of said volumes, each fluid section having an inlet area and an outlet area, the inlet areas of both of said fluid sections being connected with a common source of pressure fluid and each of said outlet areas having a separate outlet passage, a rotary assembly comprising a rotor having a plurality of vanes movable inward and outward thereof, vane track means adapted to contact and guide said vanes in their in and out movement, said vanes and vane track means cooperating to separate the inlet area of each fluid section from the outlet area thereof, said rotary assembly being arranged for rotation solely by the fluid passing from said inlet areas to said outlet areas and being active upon rotation thereof solely to control in predetermined relation to each other the fluid volumes simultaneously passing from the respective inlet areas of said fluid sections to the corresponding outlet areas thereof, and means for effecting contact between said vanes and said vane track means at least at the points of separation between said inlet and outlet areas sufficient to separate said inlet areas from said outlet areas prior to commencement of rotation of said rotary assembly.

CHARLES M. KENDRICK.